(12) United States Patent
Arell et al.

(10) Patent No.: US 7,512,416 B2
(45) Date of Patent: Mar. 31, 2009

(54) ACCESSORY PART FOR A MOBILE STATION

(76) Inventors: Kati Arell, Eristäjänkatu 3, FI-20780 Kaarina (FI); Timo Elomaa, Keskustori 7 A 21, FI-33100 Tampere (FI); Valtteri Eroma, Luoteisuäylä 19 A 6, FI-00200 Helsinki (FI)

( * ) Notice: Subject to any disclaimer, the term of this patent is extended or adjusted under 35 U.S.C. 154(b) by 305 days.

(21) Appl. No.: 10/508,097

(22) PCT Filed: Mar. 14, 2002

(86) PCT No.: PCT/IB02/00785

§ 371 (c)(1),
(2), (4) Date: Apr. 22, 2005

(87) PCT Pub. No.: WO03/077506

PCT Pub. Date: Sep. 18, 2003

(65) Prior Publication Data

US 2005/0219843 A1 Oct. 6, 2005

(51) Int. Cl.
*H04B 1/38* (2006.01)

(52) U.S. Cl. .................. 455/557; 455/66.1; 455/556.1; 455/556.2; 455/559; 348/414.1; 348/374; 348/375

(58) Field of Classification Search .................. 455/557, 455/556.1, 556.2, 575.2, 559, 66.1; 348/414.1, 348/374, 375
See application file for complete search history.

(56) References Cited

U.S. PATENT DOCUMENTS

| 2,586,644 | A | * | 2/1952 | Gilbert ...................... 381/382 |
| 6,137,525 | A | * | 10/2000 | Lee et al. .................. 348/14.02 |
| 6,233,002 | B1 | * | 5/2001 | Shibayama .............. 348/14.05 |
| 6,278,884 | B1 | * | 8/2001 | Kim ........................ 455/556.1 |
| 6,636,748 | B2 | * | 10/2003 | Monroe ................... 455/556.1 |
| 6,782,419 | B2 | * | 8/2004 | Tobita et al. ................. 709/219 |
| 2001/0005229 | A1 | * | 6/2001 | Misawa et al. ......... 348/333.01 |
| 2001/0020975 | A1 | | 9/2001 | Kerai et al. .............. 348/14.01 |
| 2001/0027474 | A1 | * | 10/2001 | Nachman et al. ............ 709/204 |

FOREIGN PATENT DOCUMENTS

| EP | 1133185 A | | 9/2001 |
| EP | 1133185 A2 | * | 9/2001 |
| EP | 1143686 A | | 10/2001 |
| EP | 1143866 A1 | * | 10/2001 |
| JP | 06141308 A | * | 5/1994 |
| WO | WO 99/43136 A | | 8/1999 |
| WO | WO-9943136 | * | 8/1999 |

* cited by examiner

*Primary Examiner*—Rafael Pérez-Gutiérrez
*Assistant Examiner*—Nimesh Patel

(57) ABSTRACT

The invention relates to an accessory part for a mobile station. In order to facilitate the use of the mobile station, it is proposed that the accessory part comprises a headset 8, 9 as well as a digital camera 3. Both can be connected simultaneously via a connector 1 of the accessory part to a mobile station. Thus, a user only has to handle a single accessory part in order to make use of two different functions enabled by a mobile station. The invention equally relates to a mobile station with which such an accessory part can be employed.

18 Claims, 2 Drawing Sheets

ACCESSORY PART FOR A MOBILE STATION

CROSS-REFERENCE TO RELATED APPLICATION

This application is the U.S. National Stage of International Application Number PCT/IB02/00785 filed Mar. 14, 2002 and published in the English language on Sep. 18, 2003 under International Publication No. WO 03/077506 A1 with international search report.

FIELD OF THE INVENTION

The invention relates to an accessory part for a mobile station. The invention equally relates to a mobile station.

BACKGROUND OF THE INVENTION

Accessory parts for mobile stations, like a mobile phone, are well known in the state of the art for enabling or facilitating the use of special functions of a mobile station.

A common accessory part is for example a headset that can be plugged in to a mobile station. Such a headset enables a comfortable, handsfree operation of a mobile station.

Another accessory part that is available on the market is an add-on digital camera that can be connected to a mobile station. An add-on digital camera enables e.g. an immediate transmission of photographs via a mobile station, even if the mobile station itself does not comprise a camera. But it is equally known to integrate a digital camera entirely in a mobile station.

SUMMARY OF THE INVENTION

It is an object of the invention to facilitate a comprehensive use of a mobile station.

This object is reached on the one hand with an accessory part for a mobile station comprising a headset, a digital camera and a connector. The connector enables a simultaneous connection of the headset and the camera with a mobile station. It is to be noted that only the mechanical connection has to be simultaneous. The active electrical connection can be either simultaneous or alternative for the headset and the camera.

On the other hand, the object of the invention is reached with a mobile station designed for co-operating with the accessory part of the invention. Such a mobile station comprises a connector for connecting a headset and a digital camera of an accessory part for this mobile station simultaneously to the mobile station. Further, such a mobile station comprises processing means enabling an exchange of data and signals via the connector of the mobile station with an accessory part including a headset and a camera. The enabled exchange of data and signals includes at least the transmission of audio signals from the mobile station to the headset and the transmission of image data from the camera to the mobile station. Preferably, the enabled exchange of data and signals includes as well the transmission of audio signals from a microphone associated to the headset to the mobile station, and possibly as well the transmission of control signals from the mobile station to the camera. The functionality of the processing means can be realized in particular by software.

The invention proceeds from the consideration that it is more comfortable for a user of a mobile station to handle one device than two devices in addition to the mobile station. Therefore, the invention proposes to combine a mobile station headset and a digital camera in a single device, which is connected via a single connector to the mobile station.

It is thus an advantage of the invention that a user of a mobile station does not have to deal with two different accessory parts for making use of two different functions of the mobile station. Further, it ensures that a camera is always available when needed, since an available headset for a mobile station is usually carried along by a user. Compared to a camera integrated into a mobile station, it is also an advantage of the invention that the accessory part can either be sold together with a mobile station or separately.

Preferred embodiments of the invention become apparent from the description which follows below.

In one preferred embodiment of the invention, the digital camera itself has only a very basic functionality. The camera may for instance only enable a user to take pictures and to send the obtained image data to the mobile station. The operating means provided to this end may be realized as one or more buttons. A user interface for the digital camera enabling a more sophisticated use of the camera and/or of the obtained data can be provided by the mobile station to which the accessory part is connected. Such a user interface can be employed by a user e.g. for interacting with the processing means of a mobile station, in order to control a processing of image data obtained from the camera by these processing means.

The camera preferably comprises at least a lens and a shutter, in case it is a non-digital camera. In case the camera is a digital camera, the camera preferably comprises at least a lens and an image sensor, for example a CMOS (complementary metal-oxide-semiconductor) image sensor, a CCD (charge-coupled device) type image sensor or any other suitable kind of image sensor. In this case, reading the image from the sensor is activated whenever a picture is to be taken, as is well known from the state of the art. In order to enable a user to operate the shutter or to activate reading an image from the sensor, an activation key can be provided at the camera. Alternatively, the user interface of the mobile station could be used for operating the shutter or for activating the image sensor.

A still image or video images can be transmitted to the mobile station automatically after a photograph or a video was taken, or upon an explicit request by a user. In the latter case, the user could browse the image data in particular with the mobile station, in order to decide which image data are to be transmitted.

The camera further preferably comprises a view finder, but alternatively, also the display of the mobile phone could be used as a view finder.

In a preferred embodiment of the invention, the camera comprise a movable hatch. This hatch can be used to alternate the electrical connection of the mobile station to the headset or the camera. In case of a digital camera, the hatch may be provided in addition or alternatively for starting the camera circuitry or at least for waking it up from sleep. The hatch may further protect the lens in one of its positions, whenever the camera is not in use.

In another preferred embodiment of the invention, the camera comprises in addition at least one LED (light emitting diode), which indicates whether the device is ready to take a picture and/or whether data processing is taking place.

Advantageously, the accessory part comprises a loop-like structure, which can be put around the neck of a user. This enables an easy and comfortable use and transportation of the accessory part. At least a portion of the loop-like structure should be formed by a cable providing a connection between the connector and the headset. In case the headset is a stereo headset comprising two earphones, two cables connecting a respective different one of the earphones to the connector can be employed for forming the loop-like structure. This minimizes additional material required for forming a loop-like structure.

In a further preferred embodiment of the invention, the accessory part comprises a microphone. The microphone can be integrated in particular into a cable of the accessory part, e.g. into a provided loop-like structure, or into the camera.

The digital camera of the accessory part according to the invention is primarily meant to be realized as a camera taking photographs, but it could also be realized as a digital video camera. It is understood that the term image data always relates as well to the data of still images captured by a video camera or a regular camera, as to the data of video images captured by a video camera.

In case the camera is a video camera, operating means should be provided which enables a user to initiate the capture of a video. In case the operating means are given by an activation key, the same key could be pressed a second time for ending the recording. Alternatively, a second key could be provided to this end. Memory or other technology restrictions might also limit the recording automatically.

If video feed is supported by the camera, an additional man-machine interface like a switch button should be provided as further operating means by the camera or by a connected mobile station for switching between still image and video modes. Alternatively, the video and the still mode could also be set from a user interface of the mobile station.

The accessory part according to the invention can be employed in particular, though not exclusively, with mobile stations not equipped with an integrated camera.

BRIEF DESCRIPTION OF THE FIGURES

In the following, the invention is explained in more detail by way of example with reference to drawings, of which

DETAILED DESCRIPTION OF THE INVENTION

Figure 1:
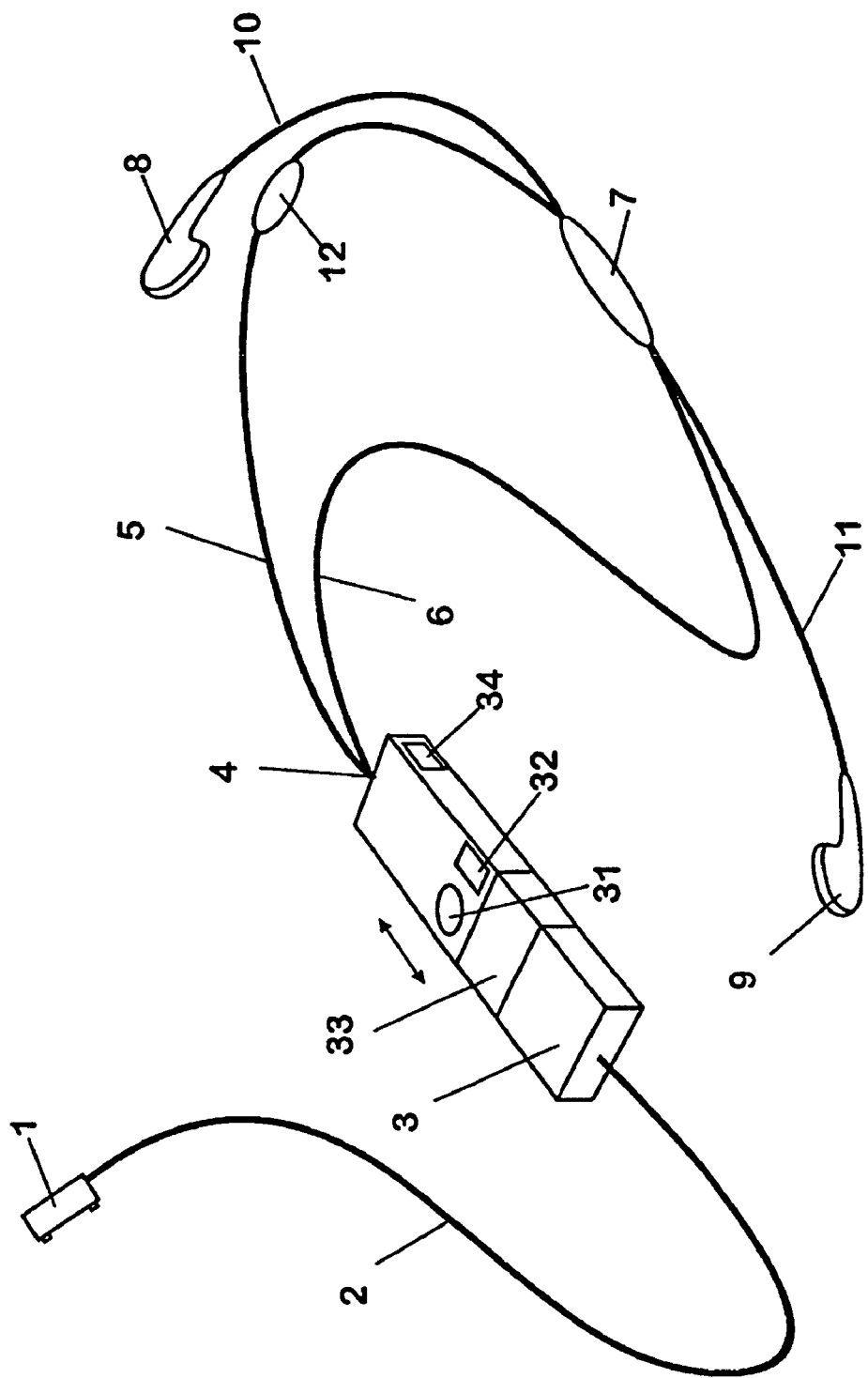
FIG. 1 is a sketch showing an embodiment of an accessory part according to the invention.

FIG. 1 presents an embodiment of the accessory part according to the invention.

The depicted accessory part comprises a connector 1 which is attached via a cable 2 to a camera 3. The cable 2 is not shown entirely in the FIGURE. The camera 3 is further connected to a cable 4 which is separated into two cables 5, 6 in short distance to the connection to the camera 3. These two cables 5, 6, which have the same length, are closed to a loop-like structure by a connecting element 7. A respective earphone 8, 9 of a stereo headset is further connected via a respective cable 10, 11 to each side of the connecting element 7 receiving the cables 5, 6 forming the loop-like structure. The cable 10, 11 of the respective earphone 8, 9 may constitute a prolongation of the respective cable 5, 6 of the loop-like structure. Alternatively, the cables 10, 11 of the earphones 8, 9 may each be electrically connected in the connecting element 7 to another one of the cables 5, 6 of the loop-like structure. A microphone 12 is integrated into one of the cables 5 forming the loop-like structure.

The camera 3 comprises a lens 31 and a view finder 32. The lens is associated to an image sensor located within the camera 3. Moreover, a hatch 33 connected to the camera 3 is movable in the directions indicated in the FIGURE by a double-headed arrow to cover the lens 31 and the view finder 32 when the camera is not in use. Finally, a button 34 is provided on the camera 3 for activating the image sensor 31 in order to take a picture. The camera 3 also comprises a memory for storing image data of taken photographs. The camera 3 may be designed for supporting imaging in portrait mode in addition or instead of supporting imaging in standard mode.

For making use of the accessory part, it is first connected via its connector 1 to a mobile phone having a bottom connector. The mobile phone should further comprise a software supporting the use of a plug-in camera.

Figure 2:
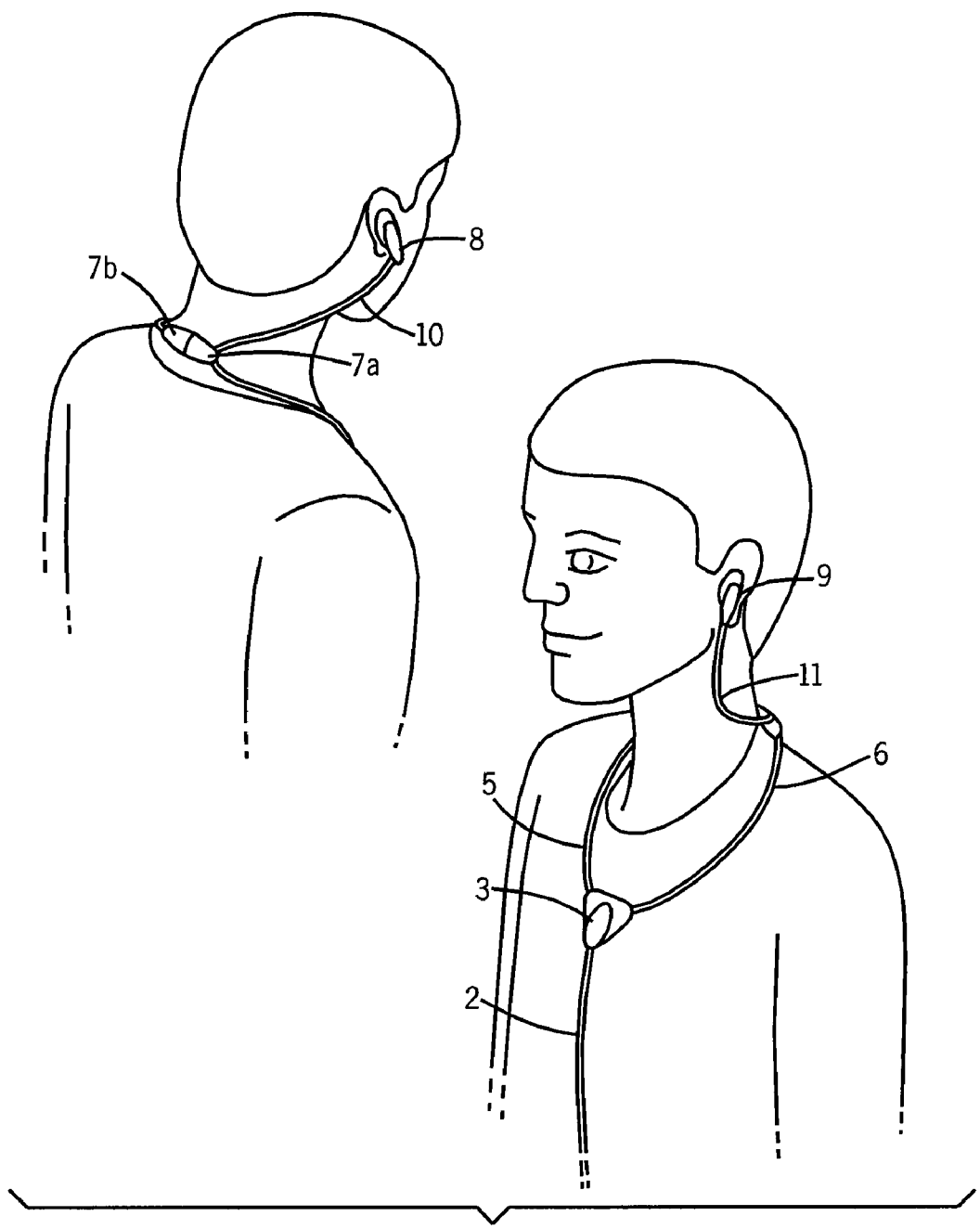
FIG. 2 is a sketch illustrating the use of an embodiment of the accessory part according to the invention by a user.

A user can then put the loop-like structure around the neck, as illustrated in FIG. 2 for a slightly modified accessory part.

FIG. 2 shows more specifically a front and a rear view of a user using a second embodiment of the accessory part according to the invention. The basic structure of this second embodiment is the same as the basic structure of the first embodiment depicted in FIG. 1, and corresponding features are labeled with the same reference numerals as in FIG. 1. In contrast to the first embodiment, however, the two cables 5, 6 forming the loop-like structure are connected directly to the camera 3, not via a combining cable 4. The connecting element is further composed of two parts 7a, 7b. The first part 7a is fixed to cables 5 and 10, while the second part 7b is fixed to cables 6 and 11. The two part 7a, 7b are connected to each other by a releasable, snapping connection, which allows the user to put the loop-like structure around his/her neck and to remove it again in a particularly comfortable manner. The camera 3 is not depicted in detail in FIG. 2, since it comprises the same components as in the first embodiment.

As can be seen in FIG. 2, the loop-like structure is put around the neck of the user in a way that the connecting element 7a, 7b rests against the back of the neck. The camera 3, which is arranged in the loop-like structure opposite to the connecting element 7a, 7b, is thus hanging in front of the chest of the user. In this position, the lens 31 of the camera 3 is located on one side of the view finder 32 of the camera 3, i.e. the camera 3 is turned by 90° compared to a regular camera. This becomes apparent in detail from FIG. 1. The microphone 12, which is not shown explicitly in FIG. 2, is further located at a relatively short distance to the mouth of the user, since it is inserted in cable 5. The earphones 8, 9 are connected to the ears of the user for a handsfree conversation via the mobile phone or for listening to music stored in the mobile phone. The camera 3 is in a position that does not cause any annoyance during such activities.

In addition, the user can take a snapshot with the digital camera 3 any time. To this end, the user simply uncovers the lens 31 and the view finder 32 by moving the hatch 33 and lifts the camera 3 up into a suitable position for taking a picture, turning it by 90°. Moving the hatch 33 activates at the same time the camera circuit. It is not necessary to unplug the headset from the mobile phone and to plug in another accessory part comprising a camera. The user can then select a subject through the view finder 32 of the camera and activate the image sensor by pressing button 34, in order to take a picture. The image data generated for this picture can be stored for example in the memory of the camera 3.

The user may then browse the images currently stored in the memory of the camera 3 and select specific images for a download from the camera 3 to the mobile phone via a user interface of the mobile phone. Alternatively, the camera could send all captured images automatically to the mobile phone. The user interface of the mobile phone further enables the user to decide what to do with downloaded image data. The user can attach an image for example to a multimedia message and transmit the message using a multimedia messaging service (MMS). Alternatively, the user could also attach an image to an email or to any other messaging type that supports also the transmission of images.

The described embodiments constitute only two of various possible embodiments of the invention. The described elements and functions can in particular be combined differently, and also be varied or supplemented in any suitable way.

The invention claimed is:

1. An accessory part for a mobile station comprising:
a first earphone and a second earphone;
a first cable configured to connect the first earphone to a first portion of a connecting element and a second cable configured to connect the second earphone to a second portion of the connecting element, wherein the first portion of the connecting element is detachable from the second portion of the connecting element;
a third cable configured to connect the first portion of the connecting element to a camera and a fourth cable configured to connect the second portion of the connecting element to the camera;
a microphone mounted to at least one of the first cable, the second cable, the third cable, or the fourth cable;
the camera;
a fifth cable configured to connect the camera and a connector; and
the connector, wherein the connector is configured to simultaneously plug the first earphone, the second earphone, the microphone, and the camera into a mobile station.

2. The accessory part of claim 1, wherein the connector is configured to receive image data from the camera, provide the received image data to the mobile station, and exchange audio data with the first earphone, the second earphone, and the microphone.

3. The accessory part of claim 1, wherein the third cable, the fourth cable, and the connecting element form a loop-like structure configured to be placed around a neck of a user.

4. The accessory part according to claim 1, wherein the fifth cable is downstream relative to the camera such that the fifth cable extends between the camera and the connector, and further wherein the third cable is upstream relative to the camera such that the third cable extends between the camera and the connecting element.

5. The accessory part according to claim 1, wherein the third cable is downstream relative to the connecting element such that the third cable extends between the connecting element and the camera, and further wherein the first cable is upstream relative to the connecting element such that the first cable extends between the connecting element and the first earphone.

6. The accessory part according to claim 1, wherein said camera comprises at least a lens and a shutter for said lens.

7. The accessory part according to claim 1, wherein said camera is a digital camera and comprises at least a lens and an image sensor.

8. The accessory part according to claim 7, wherein said camera comprises a hatch movable between a first position in which said hatch covers said lens, and a second position in which said hatch does not cover said lens.

9. The accessory part according to claim 1, wherein said camera comprises a hatch movable between a first position and a second position, and wherein moving said hatch from said first position to said second position alternates an electronic connection of the mobile station.

10. The accessory part according to claim 1, wherein said camera is a digital camera, wherein said digital camera comprises a hatch movable between a first position and a second position, and wherein moving said hatch from said first position to said second position causes said digital camera to turn on.

11. The accessory part according to claim 1, wherein said camera includes a view finder.

12. The accessory part according to claim 1, wherein said camera comprises operating means for enabling a user to take a picture with said camera.

13. The accessory part according to claim 1, wherein said camera is a digital video camera comprising operating means for enabling a user to make a video.

14. The accessory part according to claim 13, wherein said operating means enable the user to switch said digital video camera between a still mode for capturing still images and a video mode for capturing the video.

15. The accessory part according to claim 1, wherein said camera further comprises a memory for storing the image data taken with said camera.

16. The accessory part according to claim 1, wherein said camera further comprises means for transmitting the image data from said camera to the mobile station.

17. The accessory part according to claim 1, wherein said camera further comprises an LED (light emitting diode) for indicating a current state of said camera.

18. The accessory part according to claim 1, wherein said camera is integrated into at least one of the third cable, the fourth cable, or the fifth cable.

* * * * *